United States Patent [19]

Williams et al.

[11] Patent Number: 5,221,869
[45] Date of Patent: Jun. 22, 1993

[54] MOTOR ASSEMBLY FOR CHAIN-DRIVE GARAGE DOOR OPERATOR

[75] Inventors: Gregory E. Williams, Cuyahoga Falls; Terry L. Crock, Massillon; Nicholas A. Dragomir, Alliance; Thomas Angelini, Sebring, all of Ohio

[73] Assignee: GMI Holdings, Inc., Alliance, Ohio

[21] Appl. No.: 819,867

[22] Filed: Jan. 13, 1992

[51] Int. Cl.$^5$ .......................... H02K 7/06; E05F 11/00
[52] U.S. Cl. ................................ 310/83; 310/40 MM; 49/199
[58] Field of Search .............. 310/83, 90, 91, 40 MM; 49/25, 26, 28, 199, 200

[56] References Cited

U.S. PATENT DOCUMENTS

| 3,816,782 | 6/1974 | Dow et al. | 310/90 |
| 4,055,023 | 10/1977 | Gatland et al. | 49/28 |
| 5,036,899 | 8/1991 | Mullet | 49/200 |
| 5,040,332 | 8/1991 | Aquilina | 49/200 |

Primary Examiner—Steven L. Stephan
Assistant Examiner—Matthew Nguyen
Attorney, Agent, or Firm—Pearne, Gordon, McCoy & Granger

[57] ABSTRACT

A door operator for a reversibly operable door, such as a garage door, includes a frame and a carriage movably mounted on the frame and attached to a door for moving the door between open and closed positions. A flexible drive member, such as an endless chain, extends on the frame and is capable of moving the carriage. A drive train is on the frame connected for moving the flexible drive member. A motor housing is mounted on the frame within the motor housing and connected to the drive train. The motor has a shaft extending from the motor housing and engaging the drive train. A bearing assembly that includes metal thrust bearings is on the shaft adjacent to the motor. The metal thrust bearing assembly increases the performance of the electric motor, and thus provides a more powerful motor without changing to a larger motor or otherwise modifying the motor design. The motor is mounted on the frame so as to allow the shaft freely to move axially relative to the motor to permit the shaft to self-align. The rotor thus seeks its position of least resistance and maintains this position without manual adjustment, providing an improvement in motor performance.

15 Claims, 5 Drawing Sheets

MOTOR ASSEMBLY FOR CHAIN-DRIVE GARAGE DOOR OPERATOR

BACKGROUND OF THE INVENTION

1. Field of the Invention

This invention relates to automatic garage door operators, and more particularly to electric motors used in chaindrive door openers.

2. Description of the Prior Art

Garage door operators are well known and are commonly used to automatically open and close upwardly acting overhead garage doors. These garage door operators, which are driven by electric motors and which are usually remotely operated by radio control, provide considerable convenience to the motorist for powered, remote opening and closing of garage doors.

Garage doors are very heavy, and although garage doors are typically balanced by torsion or helical springs, the springs may not be capable of proper adjustment to adequately balance the door. In addition, some people do not keep their garage door in top-notch operating condition by lubricating it or adjusting it monthly, and garage doors may be difficult to move because of this improper adjustment or lack of lubrication. Some users will operate the door for years without paying any attention to it and will only examine the door when the operator has completely failed to operate. In fact, some people have been known to buy a door operator only when the door has become so hard to move that they can no longer move the door easily manually, and then to install a door operator instead of adjusting or lubricating the door. As a result, the commercial door operator requires a relatively powerful motor to accomplish its purpose. In addition, the operator must be powerful enough to close the door firmly, even pushing through a small amount of snow or leaves that may accumulate at the bottom of the doorway.

Of course, in order to provide a more powerful electric motor, it is usually necessary to provide a larger motor, and this increases the cost of the door operator. Therefore, it is highly desirable to increase the power of the electric motors in door operators to the greatest extent possible without changing to a larger motor.

In chain drive garage door operators, as opposed to screw drive operators, the motor is not subjected to substantial axial loading. Therefore, the bearing assembly within the motor in chain drive garage door operators has conventionally been a series of plastic thrust washers. Thrust bearings that may be necessary in applications, such as screw drive garage door operators, in which substantial axial loading is present have heretofore though to be unnecessary in the chain drive garage door operator arrangement.

In addition, because the motor shaft in chain drive garage door operators is not subjected to substantial axial loading, the shaft conventionally has been axially fixed in place, with the rotor fixed in place with respect to the stator. In this manner, it was believed, the rotor could be placed in its optimal position and would not move from that position.

SUMMARY OF THE INVENTION

The present invention provides an improvement in the performance of chain drive garage door operators by providing novel and unique arrangements in the mounting of the motor elements. In accordance with the present invention, thrust bearings, which were previously thought to be unnecessary in chain drive garage door operators because the motor shaft is not subjected to substantial axial loads, are provided in place of the plastic thrust washers of the prior art. The use of a metal thrust bearing assembly increases the efficiency and performance of the electric motor, and thus provides a more powerful motor without changing to a larger motor or otherwise modifying the motor design.

Using the metal thrust bearing assembly of the present invention, the friction on the motor shaft and on the rotor is reduced, allowing the rotor to turn more freely. This reduction in friction also results in a reduction in heat. The heat produced by the prior art thrust washer arrangement sometimes caused the plastic thrust washers to bond together, reducing the effectiveness of the washers. This problem is avoided in the present invention by reducing friction and heat and by using metal thrust washers and metal thrust bearings in place of the plastic thrust washers of the prior art.

In accordance with another aspect of the present invention, the motor shaft and rotor are mounted in a floating arrangement permitting the shaft to move axially and permitting the rotor freely to move axially within the stator. The rotor thus self-aligns and seeks a position of least resistance. This minimizes motor bind and allows maximum motor output. Because the rotor is self-aligning, it maintains its optimal position without manual readjustment. In its preferred form, the floating mounting arrangement includes an L-shaped bracket which is fastened at one end to the motor housing and which is inserted at the other end into a retainer member attached to the frame. The retainer member allows the motor to seek its own operating alignment while it limits the movement of the motor if the unit is dropped or otherwise disturbed, preventing damage to the gear housing and to the worm gear therein. This arrangement further increases motor performance and provides advantages heretofore not obtained.

These and other advantages are provided by the present invention of a door operator for a reversibly operable door. The door operator comprises a frame and a carriage movably mounted on the frame and attached to a door for moving the door between open and closed positions. A flexible drive member extends on the frame and is capable of moving the carriage. A drive train is on the frame connected for moving the flexible drive member. A motor housing is also mounted on the frame. A motor is within the motor housing and connected to the drive train. The motor has a shaft extending from the motor housing and engaging the drive train. A bearing assembly is on the shaft adjacent to the motor. The bearing assembly includes metal thrust bearings.

Also in accordance with the present invention, a door operator is provided which comprises a frame, actuating means on the frame for moving the door between open and closed positions, and drive means on the frame connected to the actuating means for operating the actuating means. A motor has a rotatable shaft extending therefrom. The shaft is connected to the drive means to propel the drive means as the shaft rotates. Means for mounting the motor on the frame includes means for freely allowing the shaft to move axially relative to the motor to permit the shaft to self-align.

DETAILED DESCRIPTION OF THE PREFERRED EMBODIMENT

Figure 1:
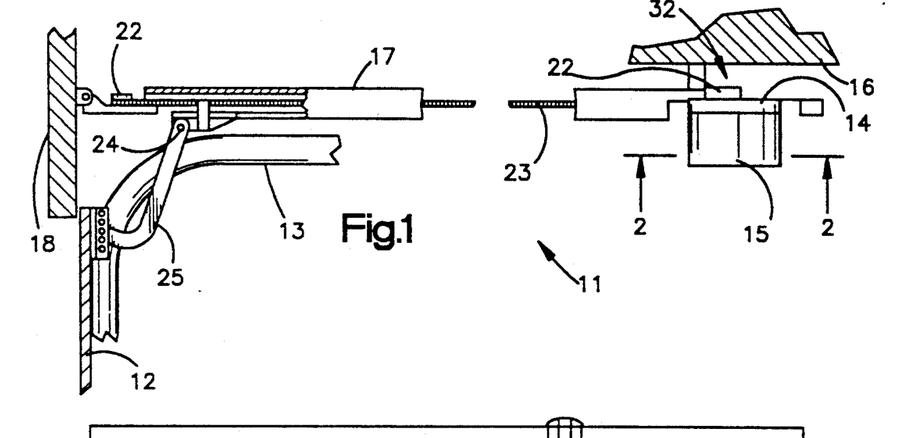
FIG. 1 is a side elevational view of a garage door operator incorporating the present invention.

Referring more particularly to the drawings, and initially to FIG. 1, there is shown a garage door operator 11 of the present invention. The operator 11 is used to move a garage door 12 between open and closed positions. The garage door 12 may be a one-piece or two-piece door which is pivoted to move to an open position adjacent the garage ceiling, or as shown it may be a sectional door rolling upwardly with rollers in a track 13. The garage door operator 11 includes a frame 14 on Which a housing 15 is mounted. The housing 15 contains an electric motor and a drive train connected to the motor. The frame 14 is adapted to be fastened in any suitable manner to the ceiling 16 of the garage. A frame extension 17 extends from the frame 14 and is fastened to the header 18 of the garage above the door 12. The frame extension 17 preferably takes the form of a T-shaped bar for stiffness and strength.

The drive train in the housing 15 has an output or drive sprocket 21, and an idler sprocket or idler roller 22 is provided near the header end of the frame extension 17. A roller chain 23, which is a flexible drive member and in this preferred embodiment is an endless chain, is trained around the drive sprocket 21 and the idler roller 22. A carriage 24 is guided for longitudinal sliding movement on the frame extension 17 and is releasably connected to the chain 23 to be propelled along the frame extension by the movement of the chain. An L-shaped door arm 25 is connected at one end to the carriage 24 and has a pivot connection at the other end to the top of the door 12. Engaging means may be provided to selectively engage and disengage the carriage 24 from the chain 23.

Figure 2:
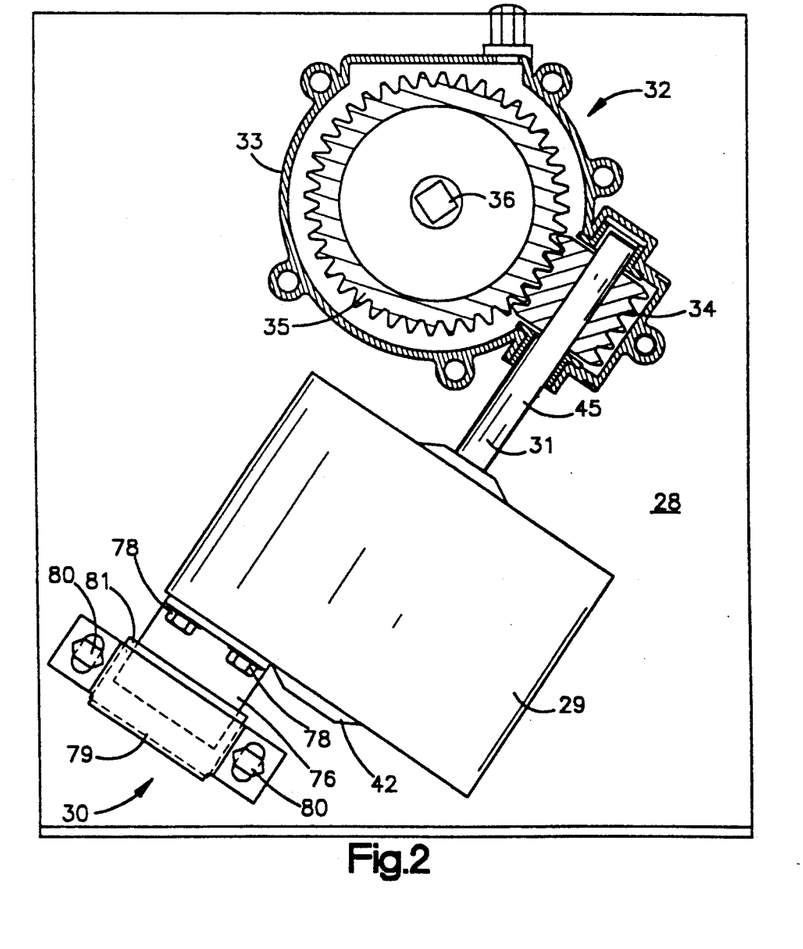
FIG. 2 is a bottom plan view of a portion of the garage door operator taken along line 2—2 of FIG. 1.

The frame 14 includes a sheet metal top base plate 28 upon which the housing 15 and many of the other components are mounted. Some of the contents of the housing 15 may be seen in FIG. 2. A motor housing 29 is mounted to the top plate 28 by means of a mounting assembly 30. A motor shaft 31 extends from the motor housing 29 and drives a drive train 32 contained in a gear housing 33 mounted on the top plate 28. The drive train 32 comprises a worm gear 34 mounted on the shaft 31 which engages a rotary gear 35. The rotary gear 35 is mounted a square shaft 36. The square shaft 36 extends through the top plate 28, and the drive sprocket 21 is mounted on the square shaft 36 on the other side of the top plate.

Figure 3:
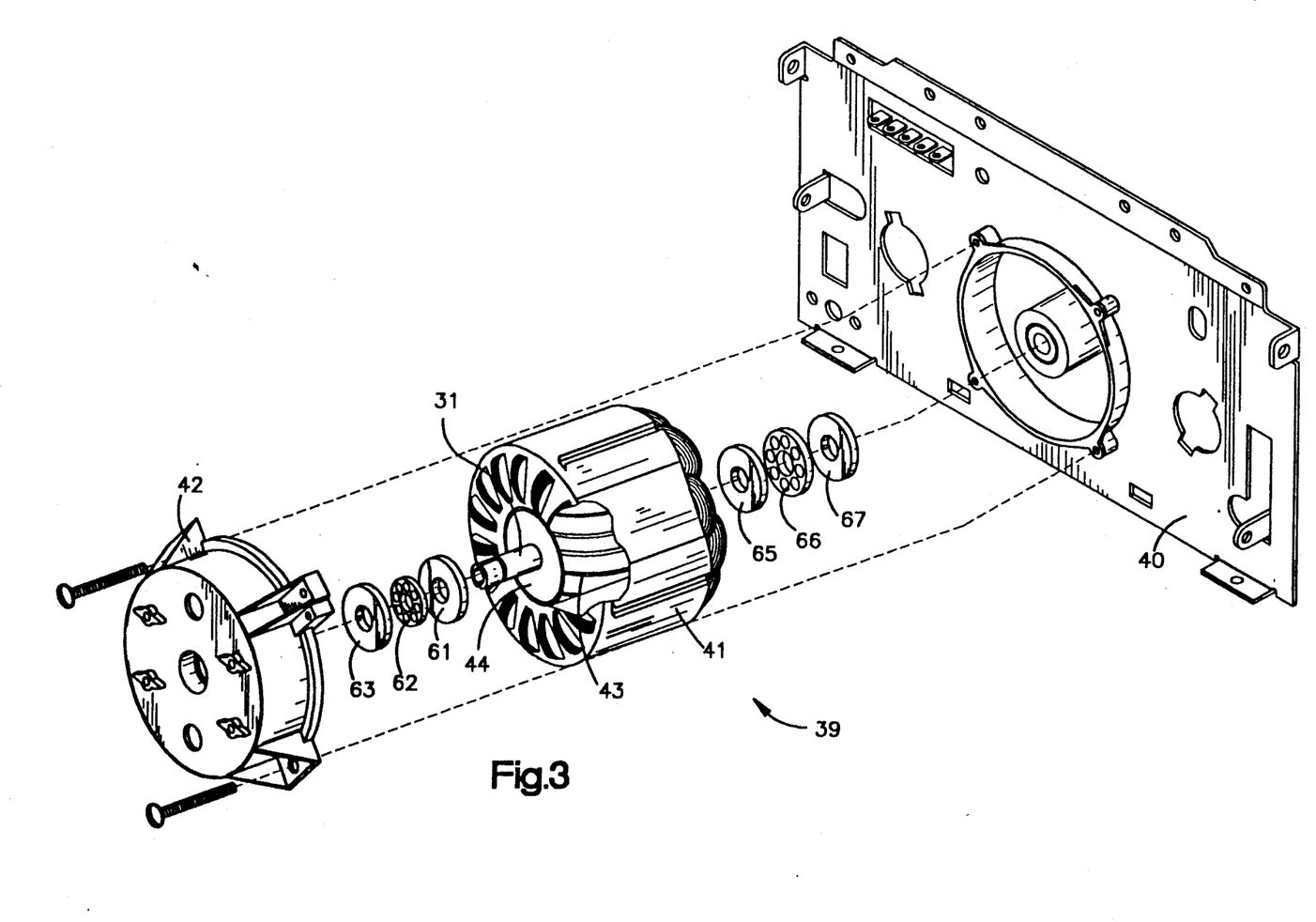
FIG. 3 is an exploded view of the motor assembly of FIG. 2.

The electric motor contained in the motor housing 29 is shown in more detail in FIG. 3. The electric motor 39 includes a stator 41 which is mounted directly on the front plate 40 of the motor housing 29 and is covered by an end shroud or end bell 42 Which extends from the rear of the motor housing. The motor 39 also includes a rotor 43 which is mounted for rotation within the stator 41 on the motor shaft 31. The rear end 44 of the motor shaft 31 is journalled in the end bell 42, and the forward end 45 of the motor shaft is journalled in the front plate 40 and extends through the front plate to the gear housing 33.

Figure 4:
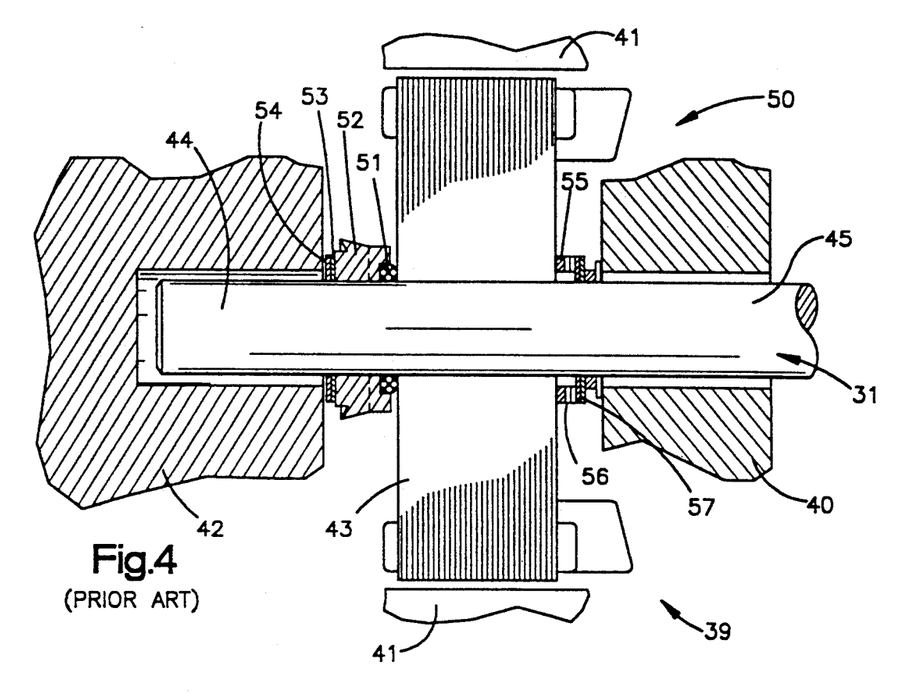
FIG. 4 is a side sectional view of a motor assembly showing the washer assembly of the prior art.

In accordance with the prior art, the motor 39 has been mounted between the end bell 42 and the front plate 40 as shown in FIG. 4. The rotor 43 was mounted to the shaft 31 and is held in place between the end bell 42 and the front plate 40 by the prior art thrust washer assembly 50 shown in FIG. 4, so that the rotor 43 is properly aligned with the stator 41 to achieve maximum performance of the motor. On the rear end of the shaft 31, the bearing assembly 50 comprises a rubber washer 51 adjacent to the rotor 43. Behind the rubber washer 51 is a plastic spacer 52, and behind the spacer is a pair of plastic thrust washers 53 and 54. The rear thrust washer 54 bears against the end bell 42. At the forward end of the rotor 43 is a felt and phenolic washer 55, and in front of the washer 55 is a plastic thrust washer 56. In front of the washer 56 is a plastic seal 57. The plastic seal 57 bears against the front plate 40.

Figure 5:
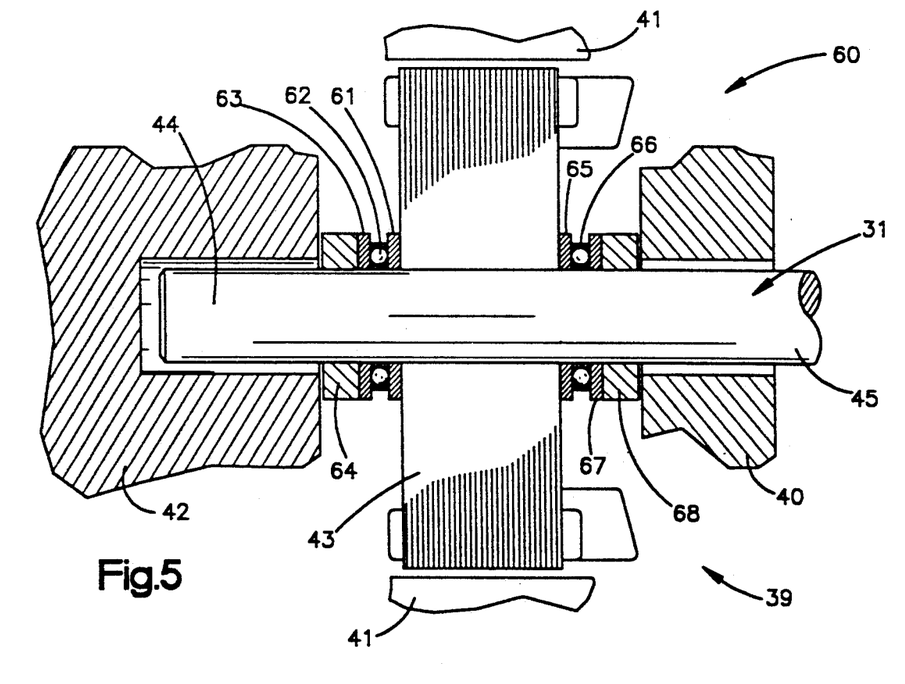
FIG. 5 is a side sectional view similar to FIG. 4 showing the bearing assembly of the present invention.

In accordance with the present invention, the thrust washer assembly 50 of the prior art has been advantageously replaced by a thrust bearing assembly 60 shown in FIGS. 3 and 5. On the rear end 44 of the shaft, the bearing assembly 60 comprises a metal thrust washer 61 mounted against the rotor 43. Behind the metal thrust washer 61 is a metal thrust bearing 62, and behind the metal thrust bearing 62 is another metal thrust washer 63, so that the thrust bearing 62 is sandwiched between the thrust washers 61 and 63. Behind the thrust washer 63 is a plastic spacer 64 which bears against the end bell 42. On the forward end 45 of the motor shaft 31, the bearing assembly 60 provides a similar arrangement comprising a metal thrust washer 65, a metal thrust bearing 66, another metal thrust washer 67, and a plastic spacer 68, with the thrust washer 65 positioned against the rotor 43, the thrust bearing 66 sandwiched between the thrust washers 65 and 67, and the spacer 68 positioned against the front plate 40.

While the thrust bearing assembly 60 shown in FIG. 5 is preferred, variations can be used within the scope of this invention. For example, the thrust bearing with the pair of thrust washers may be used on only one side of the rotor while a simple spacer is used on the other side. Such an arrangement still provides many of the advantages of the present invention.

Figure 6:
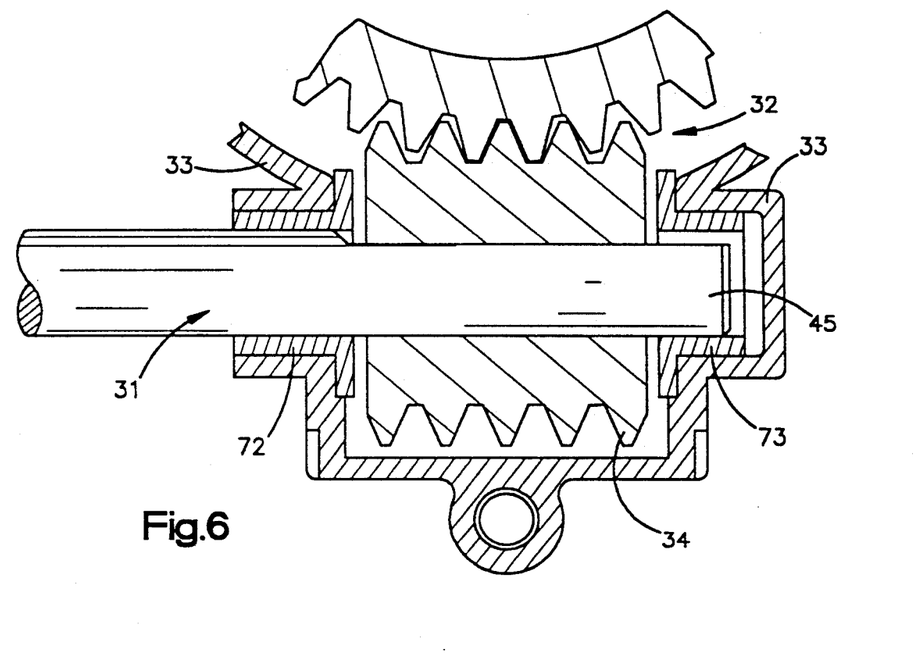
FIG. 6 is a bottom plan view of a portion of FIG. 2 to a larger scale showing the worm gear at the end of the motor shaft.
Figure 7:
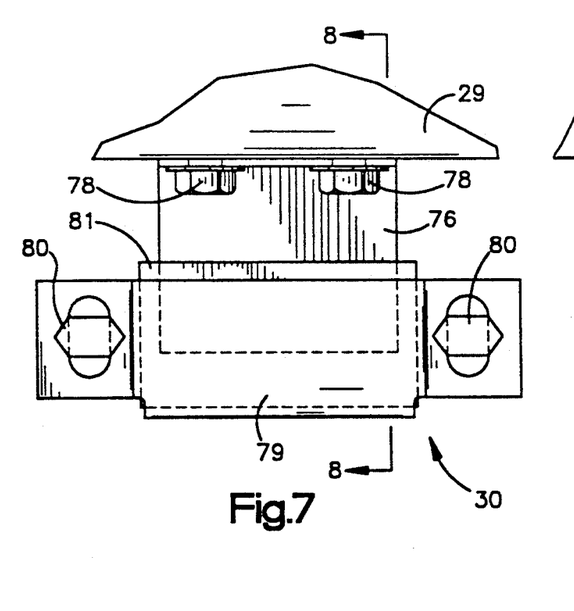
FIG. 7 is a bottom plan view of a portion of FIG. 2 to a large scale showing the motor mounting assembly.
Figure 8:
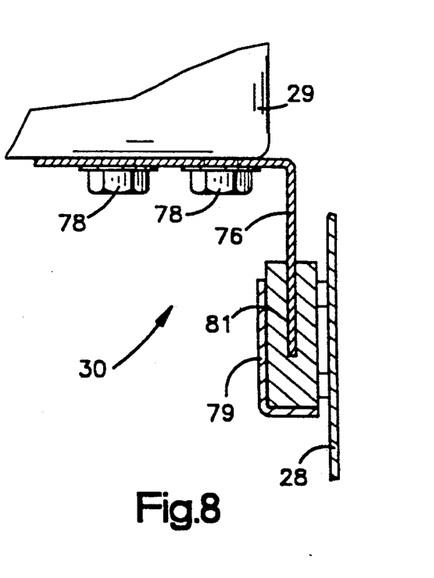
FIG. 8 is a side sectional view taken along line 8—8 of FIG. 7.
Figures 9, 10:
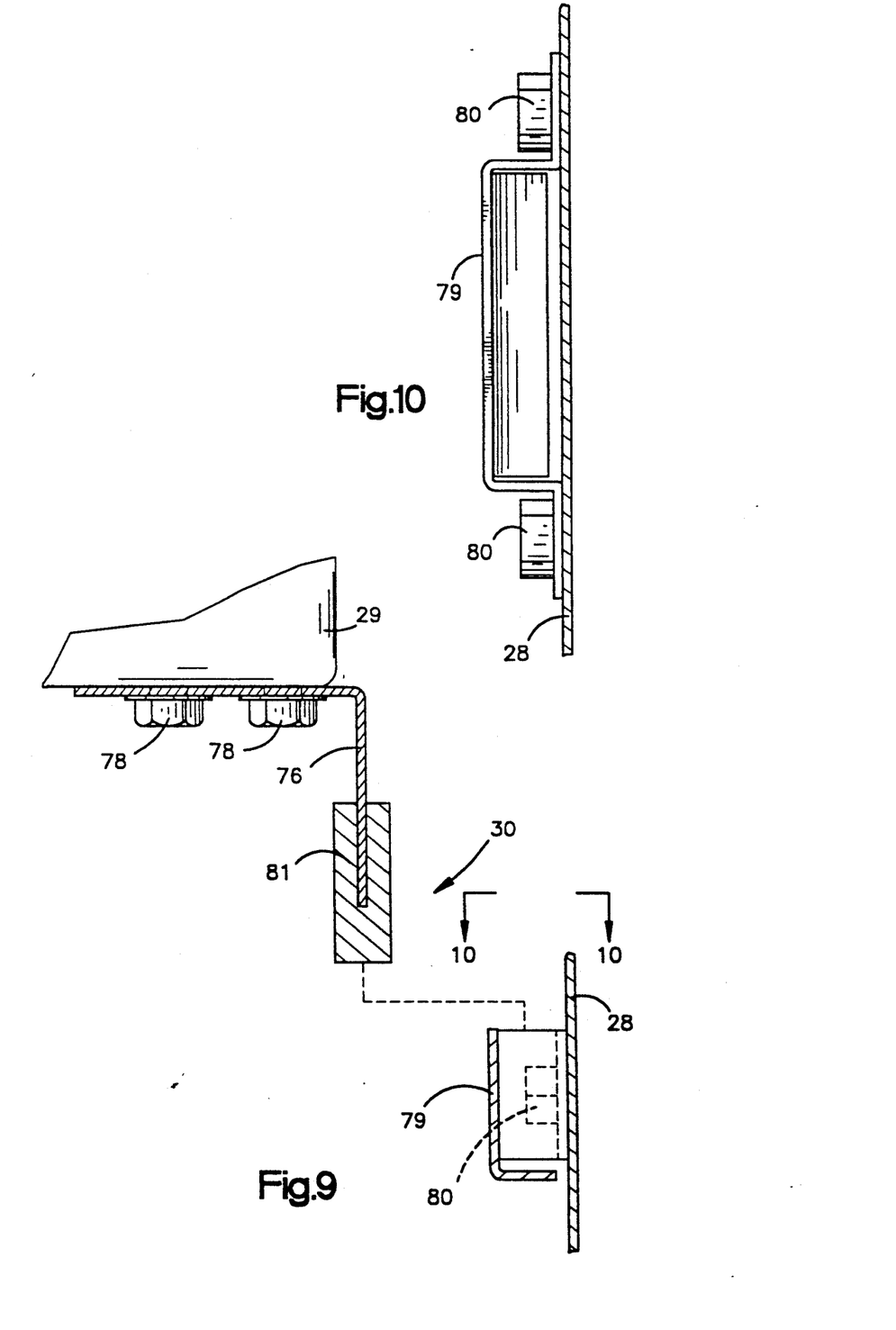
FIG. 9 is a side sectional view similar to FIG. 8 showing the insertion of the motor mounting bracket into the retainer member.
FIG. 10 is a side sectional view taken along line 10—10 of FIG. 9.

The forward end 45 of the motor shaft extends through the front plate 40 of the motor housing to the drive train 32 contained in the gear housing 33. The worm gear 34 is mounted on the forward end 45 of the motor shaft as shown in FIG. 6. The end 45 of the shaft is keyed with one side of the shaft being flattened, giving the shaft a D shape in cross section, and the worm gear 34 has a correspondingly shaped keyed opening for the shaft, so that the gear is locked to rotate with the shaft. However, the worm gear 34 is otherwise unattached to the shaft 31, allowing the worm gear to float axially along the shaft. The worm gear 34 engages the rotary gear 35 which forms a part of the drive train 32 and which is connected to the drive sprocket 21.

The forward end 45 of the motor shaft is mounted within the housing 33 by means of flanged bushings 72 and 73 which are mounted on the shaft on either side of the worm gear 34. The bushings 72 and 73 limit the axial movement of the worm gear 34 relative to the gear housing 33, but the worm gear is otherwise mounted wit h clearance on either side between the worm gear and the bushings 72 and 73, so that the worm gear can move axially with respect to the motor shaft and so that motor shaft is free to move longitudinally respect to the drive train 32.

The motor housing 29, including the end bell 42, is attached to the top plate 28 by means of the floating motor mounting assembly 30 shown in more detail in FIGS. 7, 8, 9 and 10. The motor mounting assembly 30 includes an L-shaped bracket 76 one end of which has slots 77 which permit the bracket to be fixedly attached to the motor housing 29 by means of bolts 78. The other end of the bracket 76 extends into a retainer member 79 which is attached to the front plate 40 by bolts 80. The retainer member 79 is open along the end facing the motor housing 29 to permit the bracket 76 to move laterally with respect to the plate 40. Preferably, a motor vibration isolating member 81 is placed over the end of the bracket 76 and within the retainer member 79 to reduce the transmission of motor vibration and noise from the housing to the plate 40 and the frame 14.

With the rear end 44 of the motor shaft being mounted in the end cap 42 which is attached to the frame 14 by means of the floating motor mounting assembly 30, and with the forward end 45 of the motor shaft being connected to the frame by means of the floating worm gear assembly, the motor shaft 31 is free to move axially with respect to the frame, and the rotor 43 is free to move axially with respect to the stator 41. The motor shaft 31 will thus move to align itself and seek the point of least resistance. The positioning of the motor shaft 31 at this location will produce increased motor efficiency.

In addition, the rear of the motor housing 29 can move laterally with respect to the top plate 28 by movement of the bracket 76 along the length of the retainer member 79. The motor will thus self-align and seek it optimal operating position. The retainer member 79 limits the movement of the motor housing 29 and of the motor therein if the door operator is dropped or otherwise impacted, so that damage to the gear housing 33 and to the free-floating worm gear 34 therein is prevented.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way this is inconsistent with the extent to which the progress in the art has been advance by the invention.

What is claimed is:

1. A door operator for a reversibly operable door, which comprises:
   a frame;
   a carriage movably mounted on the frame and attached to a door for moving the door between open and closed positions;
   a flexible drive member extending on the frame and capable of moving the carriage;
   a drive train on the frame connected for moving the flexible drive member;
   a motor housing mounted on the frame;
   an electric motor within the motor housing and connected to the drive train, the motor having a rotatable shaft therein extending from the motor housing and engaging the drive train;
   a bearing assembly on the motor shaft at the motor, the bearing assembly including metal thrust bearings.

2. A door operator as defined in claim 1, wherein the electric motor comprises a stator fixedly mounted on the frame and a rotor mounted on the motor shaft within the stator, the motor shaft being mounted on one end to the frame and on the other end to the motor housing, the motor housing being movably mounted to the frame to allow axial movement of the motor shaft.

3. A door operator as defined in claim 1, wherein the electric motor comprises a stator and a rotor, the bearing assembly being mounted on the motor shaft between the rotor and the frame.

4. A door operator as defined in claim 1, wherein the electric motor comprises a stator and a rotor, the bearing assembly being mounted on the motor shaft between the rotor and the motor housing.

5. A door operator as defined in claim 1, wherein the motor shaft extends in a direction generally transverse to the direction which the flexible drive member extends.

6. A door operator as defined in claim 1, wherein the metal thus bearing assembly includes a metal thrust bearing and at least one metal thrust washer adjacent to the thrust bearing.

7. A door operator as defined in claim 1, wherein the flexible drive member is an endless roller chain.

8. A door operator as defined in claim 1, comprising in addition means for mounting the electric motor on the frame including means for freely allowing the motor shaft to move axially relative to the motor to permit the shaft to self-align.

9. A door operator which comprises:
   a frame;
   actuating means on the frame for moving the door between open and closed positions;
   drive means on the frame connected to the actuating means for operating the actuating means;
   an electric motor having a rotatable shaft extending therefore, the motor shaft being connected to the drive means to propel the drive means as the shaft rotates; and
   means for mounting the electric motor on the frame including means for freely allowing the motor shaft to move axially relative to the motor to permit the motor shaft to self-align.

10. A door operator as defined in claim 9, wherein the electric motor includes a stator and a rotor, the stator being fixedly mounted on the frame, the rotor being mounted on the motor shaft to rotate the shaft, the mounting means allowing the rotor to self-align within the stator.

11. A door operator as defined in claim 9, wherein the drive means includes at least tow gears, one of the gears being mounted on the motor shaft and connected to drive the other of the gears.

12. An electric motor drive assembly, which comprises
   a frame;
   a stator mounted on the frame;
   a rotor within the stator;
   a motor shaft extending through the rotor, the motor shaft being rotatable and the rotor being mounted on the shaft to rotate with the shaft;
   a drive train connected to the motor shaft to be driven by rotation of the shaft; and
   means for supporting the motor shaft on the frame including means for freely allowing the shaft and the rotor to move axially with respect to the rotor to permit the shaft to self-align.

13. An electric motor drive assembly as defined in claim 12, wherein the drive train includes at least two gears, one of the gears being mounted on the motor shaft and connected to drive the other of the gears.

14. An electric motor drive assembly as defined in claim 12, comprising in addition a motor housing mounted on the frame, the stator and rotor being within the motor housing, the motor shaft extending from the motor housing to engage the drive train, and a bearing assembly on the shaft at the motor, the bearing assembly including metal thrust bearings.

15. A door operator having the electric motor drive assembly as defined in claim 12, the door operator comprising in addition actuating means on the frame for moving a door between open and closed positions, the drive train operating the actuating means.

* * * * *

UNITED STATES PATENT AND TRADEMARK OFFICE
CERTIFICATE OF CORRECTION

PATENT NO. : 5,221,869

DATED : June 22, 1993

INVENTOR(S) : Gregory E. Williams, et al.

It is certified that error appears in the above-identified patent and that said Letters Patent is hereby corrected as shown below:

Column 3, line 33, "Which" should be --which--.

Column 4, line 7, "Which" should be --which--.

Column 5, line 9, "wit" should be --with--.

Column 5, line 10, delete "h"".

Column 6, line 37, "thus" should be --thrust--.

Column 6, line 54, "therefore" should be --therefrom--.

Column 6, line 68, "tow" should be --two--.

Signed and Sealed this

Eighteenth Day of January, 1994

Attest:

BRUCE LEHMAN

Attesting Officer     Commissioner of Patents and Trademarks